US012008375B2

(12) United States Patent
Favor et al.

(10) Patent No.: US 12,008,375 B2
(45) Date of Patent: Jun. 11, 2024

(54) BRANCH TARGET BUFFER THAT STORES PREDICTED SET INDEX AND PREDICTED WAY NUMBER OF INSTRUCTION CACHE

(71) Applicant: Ventana Micro Systems Inc., Cupertino, CA (US)

(72) Inventors: John G. Favor, San Francisco, CA (US); Michael N. Michael, Folsom, CA (US); Vihar Soneji, Newark, CA (US)

(73) Assignee: Ventana Micro Systems Inc., Cupertino, CA (US)

( * ) Notice: Subject to any disclaimer, the term of this patent is extended or adjusted under 35 U.S.C. 154(b) by 0 days.

(21) Appl. No.: 17/835,294

(22) Filed: Jun. 8, 2022

(65) Prior Publication Data
US 2023/0401065 A1 Dec. 14, 2023

(51) Int. Cl.
*G06F 9/38* (2018.01)
*G06F 12/0875* (2016.01)
*G06F 12/1045* (2016.01)

(52) U.S. Cl.
CPC ........ *G06F 9/3806* (2013.01); *G06F 12/0875* (2013.01); *G06F 12/1045* (2013.01); *G06F 2212/452* (2013.01); *G06F 2212/6032* (2013.04)

(58) Field of Classification Search
CPC .. G06F 9/3802; G06F 9/3806; G06F 12/0862; G06F 12/0864; G06F 12/0875;
(Continued)

(56) References Cited

U.S. PATENT DOCUMENTS 5,235,697 A   8/1993  Steely, Jr. et al.
5,418,922 A * 5/1995  Liu ..................... G06F 12/0864
                                               711/E12.063
(Continued)

FOREIGN PATENT DOCUMENTS

CN        112559049 A        3/2021

OTHER PUBLICATIONS

Tang, W., Veidenbaum, A.V., Nicolau, A., & Gupta, R.K. . Integrated I-cache Way Predictor and Branch Target Buffer to Reduce Energy Consumption. International Symposium on High Performance Computing. (Year: 2009).*
(Continued)

*Primary Examiner* — Andrew Caldwell
*Assistant Examiner* — Kasim Alli
(74) *Attorney, Agent, or Firm* — E. Alan Davis; Huffman Law Group, PC

(57) ABSTRACT

A microprocessor includes a branch target buffer (BTB). Each BTB entry holds a tag based on at least a portion of a virtual address of a block of instructions previously fetched from a physically-indexed physically-tagged set associative instruction cache using a physical address that is a translation of the virtual address, a translated address bit portion of a set index of an instruction cache entry from which the instruction block was previously fetched, and a way number of the instruction cache entry from which the instruction block was previously fetched. In response to a BTB hit based on a fetch virtual address, the BTB provides a translated address bit portion of a predicted set index that is the translated address bit portion of the set index from the hit on BTB entry and a predicted way number that is the way number from the hit on BTB entry.

21 Claims, 5 Drawing Sheets

(58) Field of Classification Search
CPC .. G06F 12/10; G06F 12/1045; G06F 12/1054; G06F 2212/452; G06F 2212/6032; G06F 2212/6082; G06F 9/3844
See application file for complete search history.

(56) References Cited

U.S. PATENT DOCUMENTS

| | | | |
|---|---|---|---|
| 5,434,985 | A | 7/1995 | Emma et al. |
| 5,692,152 | A | 11/1997 | Cohen et al. |
| 6,016,533 | A | 1/2000 | Tran |
| 6,134,654 | A | 10/2000 | Patel et al. |
| 6,356,990 | B1 | 3/2002 | Aoki et al. |
| 6,418,525 | B1 | 7/2002 | Charney et al. |
| 6,957,327 | B1 | 10/2005 | Gelman et al. |
| 7,493,480 | B2 | 2/2009 | Emma et al. |
| 8,825,955 | B2 | 9/2014 | Sleiman et al. |
| 8,959,320 | B2 | 2/2015 | Beaumont-Smith et al. |
| 9,367,471 | B2 | 6/2016 | Blasco-Allue et al. |
| 9,983,878 | B2 | 5/2018 | Levitan et al. |
| 10,157,137 | B1 | 12/2018 | Jain et al. |
| 10,613,869 | B2 | 4/2020 | Greenhalgh et al. |
| 10,740,248 | B2 | 8/2020 | Campbell et al. |
| 10,747,539 | B1 | 8/2020 | Hakewill et al. |
| 11,372,646 | B2 | 6/2022 | Chirca et al. |
| 11,550,588 | B2 | 1/2023 | Kalamatianos et al. |
| 11,687,343 | B2 | 6/2023 | Ishii et al. |
| 11,816,489 | B1 | 11/2023 | Favor et al. |
| 11,836,498 | B1 | 12/2023 | Favor et al. |
| 2006/0036836 | A1 | 2/2006 | Gelman et al. |
| 2006/0095680 | A1 | 5/2006 | Park et al. |
| 2006/0149951 | A1 | 7/2006 | Abernathy et al. |
| 2008/0215865 | A1 | 9/2008 | Hino et al. |
| 2009/0037709 | A1 | 2/2009 | Ishii |
| 2010/0017586 | A1 | 1/2010 | Gelman et al. |
| 2012/0290821 | A1 | 11/2012 | Shah et al. |
| 2014/0344558 | A1 | 11/2014 | Holman et al. |
| 2015/0100762 | A1 | 4/2015 | Jacobs |
| 2016/0117153 | A1 | 4/2016 | Salmon-Legagneur et al. |
| 2017/0109289 | A1 | 4/2017 | Gonzalez Gonzalez et al. |
| 2017/0286421 | A1 | 10/2017 | Hayenga et al. |
| 2018/0246718 | A1 | 8/2018 | Lin |
| 2019/0163902 | A1 | 5/2019 | Reid et al. |
| 2019/0317769 | A1 | 10/2019 | Hu et al. |
| 2020/0004543 | A1* | 1/2020 | Kumar ................. G06F 9/3844 |
| 2020/0081716 | A1 | 3/2020 | Yalavarti et al. |
| 2020/0082280 | A1 | 3/2020 | Orion et al. |
| 2020/0104137 | A1 | 4/2020 | Natarajan et al. |
| 2020/0150968 | A1 | 5/2020 | Fatehi et al. |
| 2021/0173783 | A1 | 6/2021 | Thyagarajan et al. |
| 2022/0156082 | A1 | 5/2022 | McDonald et al. |
| 2022/0357953 | A1 | 11/2022 | Lee et al. |
| 2023/0401063 | A1 | 12/2023 | Favor et al. |
| 2023/0401066 | A1 | 12/2023 | Favor et al. |
| 2024/0045610 | A1 | 2/2024 | Favor et al. |
| 2024/0045695 | A1 | 2/2024 | Favor et al. |

OTHER PUBLICATIONS

Asheim, Truls et al. "Fetch-Directed Instruction Prefetching Revisited." arXiv preprint arXiv:2006.13547. Jun. 24, 2020. pp. 1-5.
Barr, Kenneth et al. The Fetch Block Predictor: Implementing a Higher-Bandwidth Fetch. The Wayback Machine—https://web.archive.org/web/20200117211153/http://kbarr.net:80/courses. pp. 1-6. Archived Jan. 2020.
Seznec, Andre et al. "Multiple-Block Ahead Branch Predictors." ACM. pp. 116-127. Oct. 1996.
Zhu, Zhichun et al. "Access-Mode Predictions for Low-Power Cache Design." in IEEE Micro, vol. 22, No. 2. Pages 58-71. Year 2002.
Yu, Chun-Chang et al. "Power Reduction of a Set-Associative Instruction Cache Using a Dynamic Early Tag Lookup." Design, Automation & Test in Europe Conference & Exhibition (DATE). Grenoble, France. 2021. Pages 1799-1802.

* cited by examiner

BRANCH TARGET BUFFER THAT STORES PREDICTED SET INDEX AND PREDICTED WAY NUMBER OF INSTRUCTION CACHE

BACKGROUND

A processor includes a program counter (PC) that specifies the virtual address of the next instruction of the program to be fetched and executed. Many processors also include an instruction cache that caches blocks of instructions previously fetched from system memory to reduce instruction fetch time. Instruction blocks are typically fetched from the instruction cache using a physical address rather than the PC virtual address. Typically, the instruction cache is set associative. That is, the instruction cache is arranged as multiple sets, and each set has multiple ways, each way having an entry. One set is selected by a set index portion of the physical address. Each valid entry of the ways of the selected set includes a tag that is compared against a tag portion of the physical address to determine which way the physical address hits upon, if any, i.e., which entry's tag matches the tag portion of the physical address. The set associative arrangement may improve the performance of the instruction cache, typically measured as a hit rate. The performance improvement may be a reduction in the likelihood that a recently used and therefore likely needed again soon instruction block is replaced by a different new instruction block whose physical address aliases to the same set of the instruction cache. This is because the new instruction block may be allocated into a different way of the aliased set than the recently used instruction block to instead replace a less recently used instruction block.

The process of fetching a block of instructions from a physically-indexed physically-tagged set associative instruction cache essentially involves a series of steps. First, the virtual fetch address is translated into a physical fetch address. Next, a set index portion of the physical fetch address is used to select a set of the instruction cache. Then, a tag portion of the physical fetch address is compared against the tags of each entry in the selected set to determine which way, if any, the physical fetch address hits in. Finally, the instruction block of the hit way determined by the tag comparison is read out for provision to other units of the processor for further processing.

As may be inferred from the above, the instruction fetch process may be lengthy. One cause of the lengthy process is that the address translation, way determination, and data read out steps typically involve access to memory structures that may involve significant access times. For example, the address translation is typically performed by a translation lookaside buffer (TLB), which is itself a cache memory, as is the instruction cache. The instruction cache itself may include multiple memory structures. For example, the instruction cache may include one memory structure for storing the tags and another memory structure for storing the instruction blocks. In the case of high frequency processor designs, to access a memory structure may require longer than a single clock cycle, depending upon the size of the memory structure. As a result, pipeline stages are typically implemented in processors that operate at a high clock frequency, resulting in an instruction fetch pipeline.

Another cause of the lengthy instruction fetch process is that the address translation, instruction cache way determination, and instruction cache data read out steps are performed sequentially. Thus, in addition to the long memory structure access time, the sequential nature of the steps of the instruction fetch process lend themselves to an instruction fetch pipeline. Indeed, modern instruction fetch pipelines may be several stages in length.

Although pipelining the instruction fetch process may have advantages, such as facilitating high processor clock frequency, there are disadvantages associated with a long instruction fetch pipeline. High performance processors typically make predictions about the control flow of a program. For example, a processor may make predictions about branch instructions. More specifically, the processor may predict the presence or absence of a branch instruction in the instruction stream, whether a conditional branch instruction will be taken or not taken, and the target address of a branch instruction. The branch predictions enable the processor to continue fetching instructions without having to wait for the fetched instructions to be executed. If later (e.g., after execution of a predicted branch instruction) the processor realizes it made a misprediction, it will flush the instructions that were fetched down the incorrectly predicted path and begin fetching instructions down the correct path. The length of the instruction fetch pipeline can be a major contributor to the latency from detection of the misprediction to the provision of the correctly fetched instructions to the execution units of the processor. During the latency, the execution units are idle, which is harmful to processor performance.

SUMMARY

In one embodiment, the present disclosure provides a microprocessor that includes a branch target buffer (BTB) comprising a plurality of entries. Each entry is configured to hold a tag that is based on at least a portion of a virtual address of a block of instructions previously fetched from a physically-indexed physically-tagged set associative instruction cache using a physical address that is a translation of the virtual address, a translated address bit portion of a set index of an entry of the instruction cache from which the instruction block was previously fetched, and a way number of the entry of the instruction cache from which the instruction block was previously fetched. In response to a hit on an entry of the plurality of entries of the BTB based on a fetch virtual address, the BTB is configured to provide a translated address bit portion of a predicted set index that is the translated address bit portion of the set index from the hit on entry of the BTB and a predicted way number that is the way number from the hit on entry of the BTB.

In another embodiment, the present disclosure provides a method for use in a microprocessor that includes a branch target buffer (BTB) comprising a plurality of entries. Each entry is configured to hold a tag that is based on at least a portion of a virtual address of a block of instructions previously fetched from a physically-indexed physically-tagged set associative instruction cache using a physical address that is a translation of the virtual address, a translated address bit portion of a set index of an entry of the instruction cache from which the instruction block was previously fetched, and a way number of the entry of the instruction cache from which the instruction block was previously fetched.

The method includes, in response to a hit on an entry of the plurality of entries of the BTB based on a fetch virtual address: providing, by the BTB, a translated address bit portion of a predicted set index that is the translated address bit portion of the set index from the hit on entry of the BTB, and providing, by the BTB, a predicted way number that is the way number from the hit on entry of the BTB.

In yet another embodiment, the present disclosure provides a non-transitory computer-readable medium having instructions stored thereon that are capable of causing or configuring a microprocessor. The microprocessor includes a branch target buffer (BTB) comprising a plurality of entries. Each entry is configured to hold a tag that is based on at least a portion of a virtual address of a block of instructions previously fetched from a physically-indexed physically-tagged set associative instruction cache using a physical address that is a translation of the virtual address, a translated address bit portion of a set index of an entry of the instruction cache from which the instruction block was previously fetched, and a way number of the entry of the instruction cache from which the instruction block was previously fetched. In response to a hit on an entry of the plurality of entries of the BTB based on a fetch virtual address, the BTB is configured to provide a translated address bit portion of a predicted set index that is the translated address bit portion of the set index from the hit on entry of the BTB and a predicted way number that is the way number from the hit on entry of the BTB.

DETAILED DESCRIPTION

Figure 1:
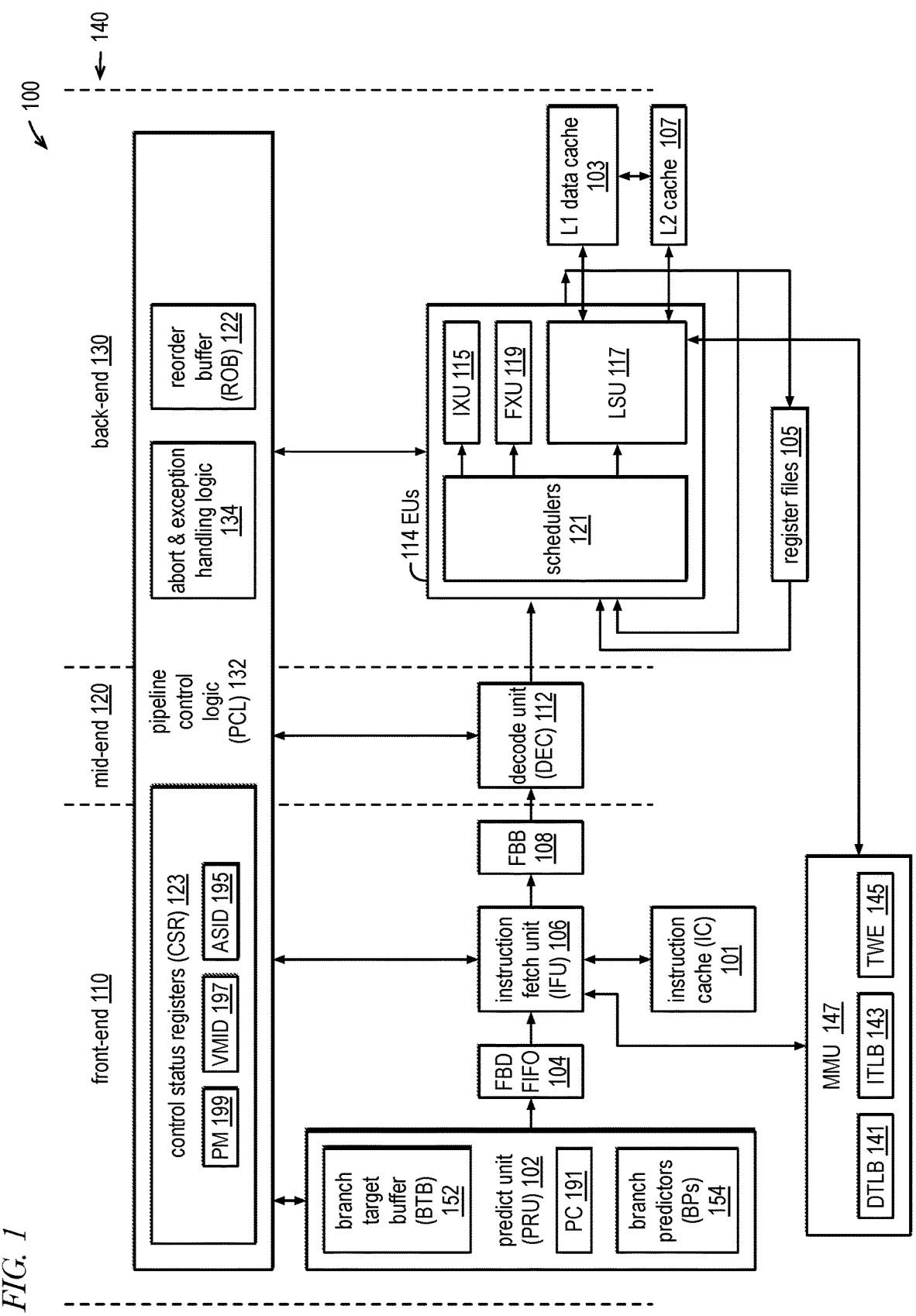
FIG. 1 is an example block diagram of a microprocessor core in accordance with embodiments of the present disclosure.

Embodiments are described in which each entry of a branch target buffer (BTB) stores a small additional amount of information to facilitate shortening the instruction fetch pipeline of the processor. More specifically, the small amount of information cached in the BTB is the set index and way number that specify the entry of the instruction cache from which the desired instruction block was recently fetched. The BTB-predicted set index and way number are used to independently access the instruction cache data random access memory (RAM) to obtain the desired instruction block without needing to wait for the address translation and instruction cache way determination steps to be performed first. That is, in parallel with initiation of the instruction cache data RAM access using the BTB-predicted set index and way number, the instruction fetch pipeline initiates access to the instruction TLB (ITLB) and initiates access to the instruction cache tag RAM using the BTB-predicted set index. Thus, the physical fetch address, which includes the correct set index, and the correct way number are obtained in parallel with the fetch of the instruction block and used to check correctness of the predicted set index and way number. In this manner, the instruction fetch pipeline is effectively shortened, or folded as described more below, to the number of stages required to access the data RAM to obtain the instruction block.

Embodiments are also described in which the short instruction fetch pipeline operates in the parallel manner described above while the BTB continues to provide set index and way number predictions but dynamically lengthens/unfolds in response to a BTB miss such that the ITLB, tag RAM, and data RAM accesses are performed serially. In one embodiment, the instruction fetch pipeline dynamically folds back up when the BTB hits again. In the case of a BTB miss, a new entry in the BTB may be created after the correct set index and way number are determined. Other events that cause the instruction fetch pipeline to unfold may include a set index misprediction by the BTB or a miss in the ITLB or instruction cache.

Each BTB entry stores only translated address bits of the instruction cache set index, and untranslated bits of the fetch virtual address are used to provide the remainder of the set index. Advantageously, by storing a relatively small number of additional bits per BTB entry (e.g., in one embodiment, 5 bits of set index and 2 bits of way number), the instruction fetch pipeline may be folded, i.e., shortened (e.g., from 6 stages to 2 stages), for a significant percentage of time, i.e., approximately the BTB hit rate. The shortening of the instruction fetch pipeline may improve processor performance by reducing the latency and penalty associated with branch mispredictions or other causes of restart of the instruction fetch pipeline.

Further advantageously, the instruction fetch pipeline may be shortened/folded while also obtaining the power saving benefit of reading out only a single way of the instruction cache data RAM per instruction block fetch. That is, in an approach taken by a conventional processor to shorten the instruction fetch pipeline, the pipeline reads out the instruction blocks from all N ways of the selected set of the data RAM in parallel with the tag RAM lookup that determines the correct way, and then the pipeline selects one of the N instruction blocks using the correct way. The conventional approach consumes significantly more power than the approach taken by the embodiments described herein that, in parallel with the tag RAM access, read out only the single way of the data RAM predicted by the BTB. The power savings may be particularly significant in embodiments in which the amount of bytes per data RAM entry is large.

FIG. 1 is an example block diagram of a microprocessor core 100 in accordance with embodiments of the present disclosure. The processor 100 includes a branch target buffer (BTB) 152 that holds instruction cache set index and way number predictions used to operate an instruction fetch pipeline in a folded mode. The instruction fetch pipeline is also dynamically operable between the folded mode and an unfolded mode.

Although a single core 100 is shown, the folded/unfolded instruction fetch pipeline techniques described herein are not limited to a particular number of cores. Generally, the folded/unfolded instruction fetch pipeline embodiments may be employed in a processor conforming to various instruction set architectures (ISA), including but not limited to, x86, ARM, PowerPC, SPARC, MIPS.

Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the folded/unfolded instruction fetch pipeline techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a level-1 (L1) data cache 103, a level-2 (L2) cache 107, a register files 105, and a plurality of execution units (EU) 114. In one embodiment, the register files 105 include an integer register file, a floating-point register file and a vector register file. In one embodiment, the register files 105 include both architectural registers as well as microarchitectural registers. In one embodiment, the EUs 114 include integer execution units (IXU) 115, floating point units (FXU) 119, and a load-store unit (LSU) 117.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. The ITLB 143 translates a fetch virtual address into a fetch physical address that is used to fetch a block of instructions from the instruction cache 101, as described below.

The microprocessor 110 may also include other blocks not shown, such as a load buffer, a bus interface unit, and various levels of cache memory above the instruction cache 101 and L1 data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags to distinguish entries for different processes. In the x86 ISA, for example, an ASID may correspond to a processor context identifier (PCID).

The core 100 may also provide machine virtualization support. Each virtual machine running on the core 100 may have its own virtual machine identifier (VMID). The TLBs may include the VMID in their tags to distinguish entries for different virtual machines. Finally, the core 100 provides different privilege modes (PM) 199, or privilege levels. The PM 199 of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

Pipeline control logic (PCL) 132 is coupled to and controls various aspects of the pipeline 140 which are described in detail herein. The PCL 132 includes a ReOrder Buffer (ROB) 122, abort and exception-handling logic 134, and control and status registers (CSR) 123. The CSRs 123 hold, among other things, the PM 199, VMID 197, and ASID 195 of the core 100. In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each PM.

The pipeline units may signal a need for an abort, e.g., in response to detection of a mis-prediction (e.g., by a branch predictor of a direction or target address of a branch instruction, or of a mis-prediction that store data should be forwarded to a load Op in response to a store dependence prediction) or other microarchitectural exception, architectural exception, or interrupt. In response, the PCL 132 may assert flush signals to selectively flush instructions/Ops from the various units of the pipeline 140.

The PRU 102 maintains the program counter (PC) 191 and includes predictors that predict program flow that may be altered by control flow instructions, such as branch instructions. In one embodiment, the PRU 102 includes the BTB 152 and branch predictors (BPs) 154. In one embodiment, the BPs 154 include a main conditional branch predictor, a secondary conditional branch predictor, an indirect branch predictor, and a return address predictor. As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB), also referred to herein as a block of instructions, or an instruction block. An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions, e.g., referred to in FIG. 5 as a fetch request 511. An FBD (e.g., as described below with respect to FIG. 3) may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 may decode architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses—also referred to as result busses or bypass busses—back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all the EUs 114 (and integrated with the ROB 122 according to one embodiment) serves all the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Embodiments of a PRU 102 and IFU 106 are described herein that advantageously facilitate operation of an instruction fetch pipeline in a folded fashion to reduce instruction fetch latency while still enjoying the benefit of reduced power consumption by reading out a single way of the instruction cache data RAM.

Figure 2:
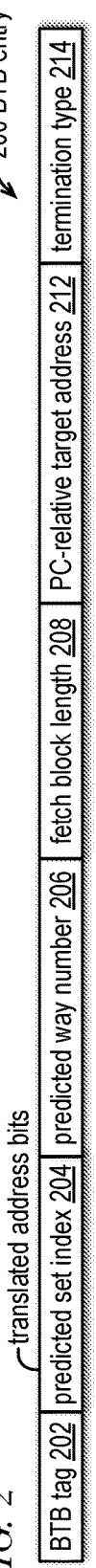
FIG. 2 is an example block diagram of an entry of the BTB of FIG. 1 in accordance with embodiments of the present disclosure.

FIG. 2 is an example block diagram of a BTB entry 200, i.e., an entry of the BTB 152 of FIG. 1, in accordance with embodiments of the present disclosure. The BTB entry 200 includes a BTB tag 202, a predicted set index 204, a predicted way number 206, a fetch block length 208, a PC-relative target address 212, and a termination type 214. As described below with respect to FIGS. 5 and 6, a value of the PC 191 of FIG. 1 is used as a fetch virtual address (FVA), e.g., FVA 512 of FIG. 5, to fetch a block of instructions from the instruction cache 101. Prior to the instruction block fetch, the FVA is also used to access the BTB 152, as described below with respect to FIGS. 4 and 6. If the FVA missed in the BTB 152, a new BTB entry 200 will be created and allocated into the BTB 152 based on the FVA, the set and way of the instruction cache 101 from which the block of instructions was fetched, and other information determined from decode and execution of the fetched block of instructions, e.g., as described below with respect to block 632 of FIG. 6.

The BTB tag 202 of the new BTB entry 200 is based on the FVA that was used to fetch the block of instructions from the instruction cache 101. In one embodiment, the BTB tag 202 is a hash of bits of the FVA, the VMID 197, and the PM 199, e.g., a hash that may be performed by BTB access logic 401 of FIG. 4. However, other embodiments are contemplated in which the BTB entry 200 is based on the FVA in other manners, e.g., simply upper bits of the FVA.

Figure 5:
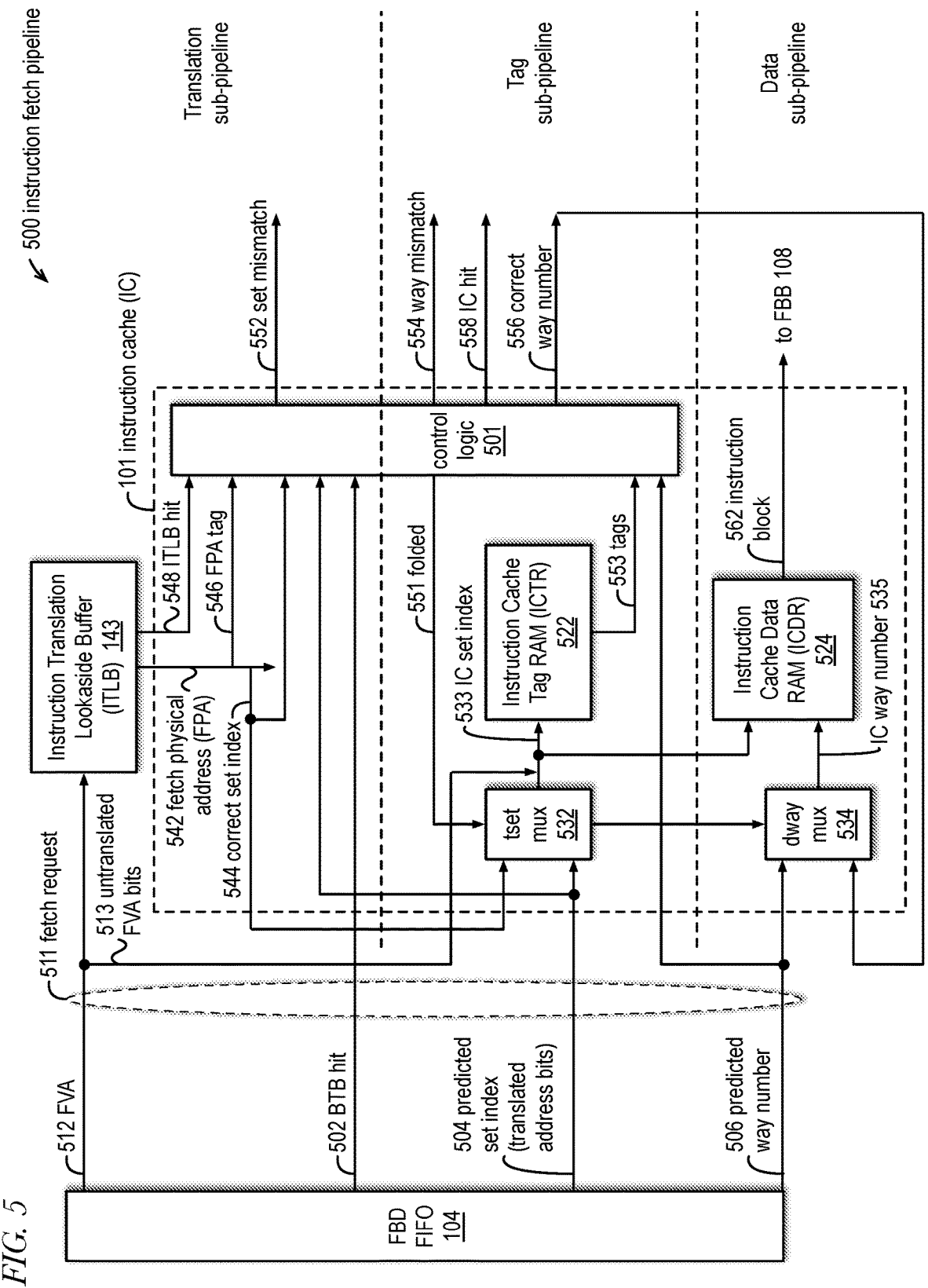
FIG. 5 is an example block diagram of an instruction fetch pipeline of the processor in accordance with embodiments of the present disclosure.

The predicted set index 204 is the value of the set index (e.g., correct set index 544 of FIG. 5) that was previously used to fetch a block of instructions from the instruction cache 101 at a fetch physical address (FPA) into which the FVA was translated (e.g., FPA 542 of FIG. 5). That is, during a first instance of a fetch request (e.g., fetch request 511 of FIG. 5) that specifies an FVA value, the instruction block is fetched from the instruction cache 101 and the correct set index 544 is written to the predicted set index 204 of the newly created BTB entry 200 to be used as a prediction of the set index during a subsequent instance of a fetch request that specifies the same FVA value. In one embodiment, to save storage space, only translated address bits of the set index are stored in the predicted set index 204 field of the BTB entry 200, whereas the untranslated address bits of the set index are provided from the FVA itself when accessing the instruction cache 101, e.g., as untranslated address bits 513 of FIG. 5.

The predicted way number 206 is the value of the way number (e.g., correct way number 556 of FIG. 5) that was previously used to fetch a block of instructions from the instruction cache 101 at a FPA into which the FVA was translated. That is, during the first instance of a fetch request that specifies the FVA value, the instruction block is fetched from the instruction cache 101 and the correct way number 556 is written to the predicted way number 206 of the newly created BTB entry 200 to be used as a prediction of the way number during a subsequent instance of a fetch request that specifies the same FVA value.

The fetch block length 208 specifies the length of a fetch block that starts at the FVA. As described above with respect to FIG. 1, the fetch block may be up to the length of a cache line of the instruction cache 101 (e.g., 64 bytes), but may be shorter if an instruction block terminating instruction, e.g., a branch instruction, appears before the end of the cache line, as described in more detail below.

The PC-relative target address 212 specifies a target address of a PC-relative branch instruction that may be calculated, e.g., by the decode unit 112, by adding the FVA and the immediate offset specified in the PC-relative branch instruction.

The termination type 214 specifies the reason for termination of the fetch block that starts at the FVA. In one embodiment, the reasons may include: the presence of a branch instruction, the presence of a "stop" type of instruction, and a sequential type that indicates a full-length fetch block (e.g., the size of a cache line of the instruction cache 101) due to the absence of a branch or stop instruction. In one embodiment, a stop instruction may include an instruction that changes privilege mode, an exception call or return from exception instruction, a breakpoint instruction, a fence instruction, and certain types of instructions that read/write a control and status register (CSR) of the processor. In one embodiment, the type of the branch instruction may be more specifically indicated, e.g., conditional branch, direct branch, indirect branch, call, return.

Figure 3:
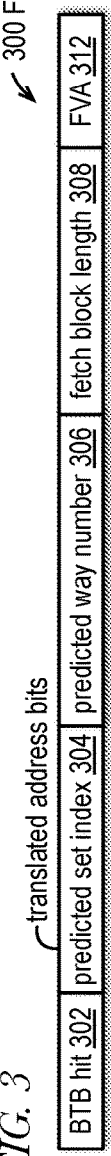
FIG. 3 is an example block diagram of a fetch block descriptor (FBD), i.e., an entry of the FBD FIFO of FIG. 1, in accordance with embodiments of the present disclosure.

FIG. 3 is an example block diagram of a fetch block descriptor (FBD) 300, i.e., an entry of the FBD FIFO 104 of FIG. 1, in accordance with embodiments of the present disclosure. The FBD 300 includes a BTB hit indicator 302, a predicted set index 304, a predicted way number 306, a fetch block length 308, and an FVA 312. As described below with respect to FIG. 4, when the PRU 102 generates an FBD, e.g., FBD 452 of FIG. 4, the FBD is written to the FBD FIFO 104 of FIG. 1 and later fetched from the FBD FIFO 104 for use by the instruction fetch pipeline 500 of FIG. 5 to fetch a block of instructions from the instruction cache 101. The BTB hit indicator 302 indicates whether the lookup of the FVA hit in the BTB 152. The predicted set index 304, predicted way number 306, and fetch block length 308 are written with the corresponding predicted set index 204, predicted way number 206, and fetch block length 208 provided by the BTB 152 in the case of a hit of the FVA in the BTB 152. The FVA 312 is the current FVA, e.g., FVA 412 of FIG. 4, used to access the BTB 152. As described herein, the predicted set index 304 and predicted way number 306 may be used to advantageously reduce the time required to fetch a block of instructions from the instruction cache 101 and facilitate operation of an instruction fetch pipeline in a folded manner.

Figure 4:
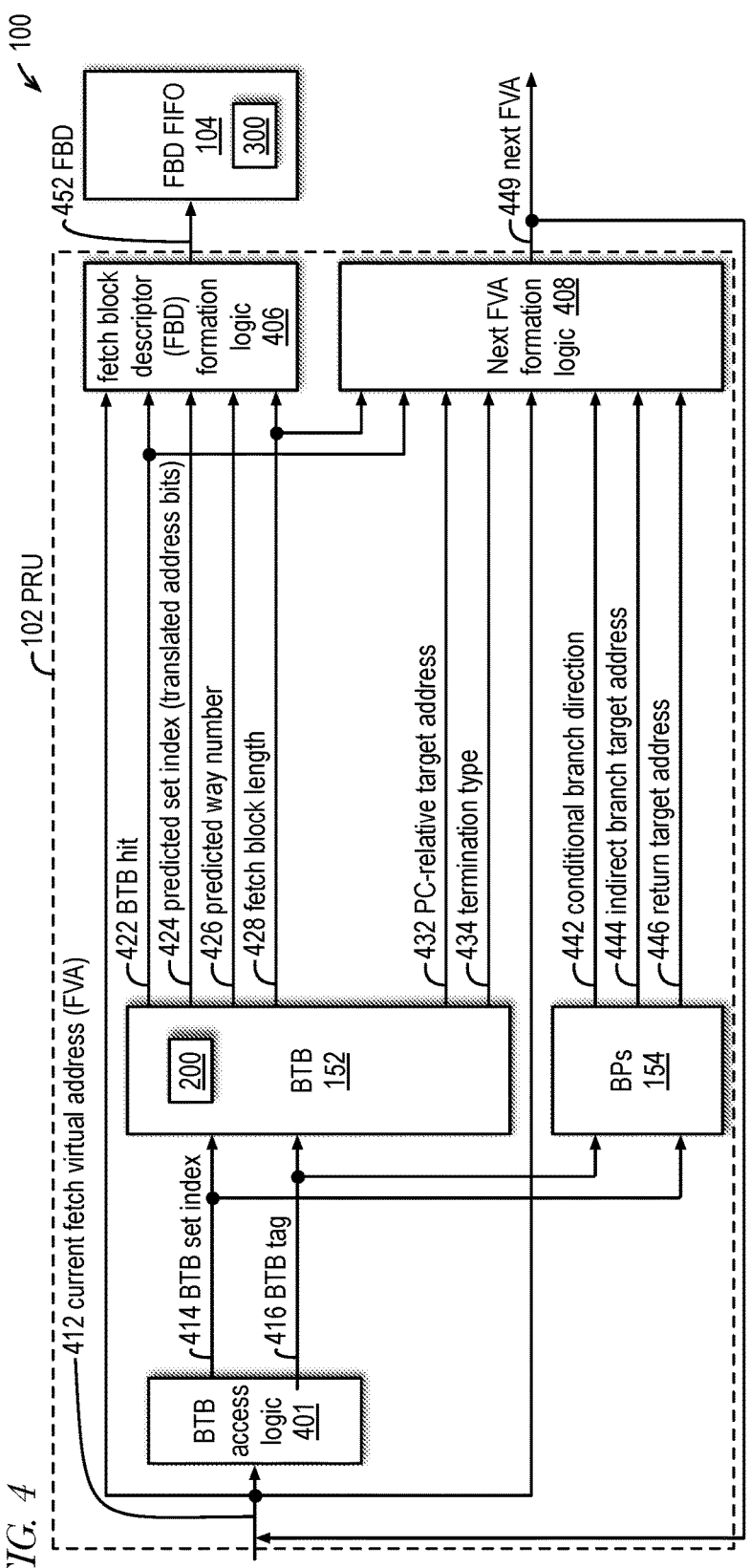
FIG. 4 is an example block diagram of the FBD FIFO and the PRU of the microprocessor core of FIG. 1, the PRU including the BTB of FIG. 1, each entry of which holds a predicted set index and predicted way, in accordance with embodiments of the present disclosure.

FIG. 4 is an example block diagram of the FBD FIFO 104 and the PRU 102 of the microprocessor core 100 of FIG. 1, the PRU 102 including the BTB 152 of FIG. 1, each entry of which holds a predicted set index and predicted way, in accordance with embodiments of the present disclosure. The PRU 102 receives a current FVA 412 and in response provides a FBD 452 and a next FVA 449. The FBD 452 is pushed into the FBD FIFO 104 and includes signals corresponding to the fields of the FBD 300 of FIG. 3. The next FVA 449 is fed back to become the current FVA 412 of a subsequent clock cycle. The PRU 102 includes the BTB 152 and branch predictors (BPs) 154 of FIG. 1, as well as BTB access logic 401, FBD formation logic 406, and next FVA formation logic 408.

In the embodiment of FIG. 4, the BTB access logic 401 receives the current FVA 412 and generates a BTB set index 414 and a BTB tag 416 that are provided to both the BTB 152 and to the BPs 154. In response to the BTB set index 414 and the BTB tag 416, the BTB 152 generates a BTB hit indicator 422 that indicates whether the BTB tag 416 matches the BTB tag 202 of a valid BTB entry 200. If so, the BTB 152 outputs the contents of the hit BTB entry 200 as a predicted set index 424, a predicted way number 426, a fetch block length 428, a PC-relative target address 432, and a termination type 434. Concurrently, in response to the BTB set index 414 and the BTB tag 416, the BPs 154 output a conditional branch direction 442, an indirect target address 444, and a return target address 446.

The FBD formation logic 406 receives the current FVA 412, the BTB hit indicator 422, the predicted set index 424, the predicted way number 426, and the fetch block length 428 and gathers them to form a FBD 452 to push into an entry 300 of the FBD FIFO 104.

The next FVA formation logic 408 receives the BTB hit indicator 422, the fetch block length 428, the PC-relative target address 432, the termination type 434, the conditional branch direction 442, the indirect target address 444, and the return target address 446 and uses them to generate the next FVA 449. If BTB hit 422 is false, the next FVA formation logic 408 predicts a maximum length sequential termination type instruction fetch block. That is, the next FVA formation logic 408 generates a value of the next FVA 449 that is the sum of the FVA 412 and the maximum fetch block length (e.g., 64 bytes). If BTB hit 422 is true, the next FVA formation logic 408 generates the next FVA 449 based on the termination type 434 and the remaining inputs. For example, if the termination type 434 indicates a PC-relative branch, then if the conditional branch direction 442 indicates "taken", the next FVA formation logic 408 outputs the PC-relative target address 432 as the next FVA 449 and otherwise outputs the sum of the FVA 412 and the fetch block length 428. If the termination type 434 indicates an indirect branch, the next FVA formation logic 408 outputs the indirect branch target address 444 as the next FVA 449. If the termination type 434 indicates a return instruction, the next FVA formation logic 408 outputs the return target address 446 as the next FVA 449. If the termination type 434 indicates a stop type instruction, the next FVA formation logic 408 outputs the sum of the FVA 412 and the fetch block length 428 as the next FVA 449.

In one embodiment, the BTB access logic 401 generates the BTB set index 414 as a hash of a subset of bits of the PM 199, the VMID 197, and the current FVA 412, and generates the BTB tag 416 as a hash of a different subset of bits of the PM 199, the VMID 197, and the current FVA 412. However, other embodiments are contemplated, e.g., in which the BTB access logic 401 outputs lower bits of the current FVA 412 as the BTB set index 414 and outputs upper bits of the current FVA 412 as the BTB tag 416.

FIG. 5 is an example block diagram of an instruction fetch pipeline 500 of the processor 100 in accordance with embodiments of the present disclosure. The instruction fetch pipeline 500 includes the FBD FIFO 104, ITLB 143, and instruction cache 101 of FIG. 1. The instruction cache 101 includes an instruction cache tag RAM (ICTR) 522, an instruction cache data RAM (ICDR) 524, a tset mux 532, a dway mux 534, and control logic 501. The FBD FIFO 104 outputs the FBD 300 at its head to provide an FVA 512, BTB hit indicator 502, predicted set index 504, and predicted way number 506, which are referred to collectively as a fetch request 511. The instruction cache 101 is a set-associative cache. In one embodiment, the instruction cache 101 is configured as having four ways, and the predicted way number 206 is two bits, although other embodiments are contemplated in which the instruction cache 101 is configured with other numbers of ways.

The ITLB 143 translates the FVA 512 into a fetch physical address (FPA) 542, assuming the FVA 512 hits in the ITLB 143. An ITLB hit indicator 548 indicates whether the FVA 512 hit in the ITLB 143 and is provided to the control logic 501. The FPA 542 includes a correct set index 544 portion and a FPA tag 546 portion, each of which is provided to the control logic 501. The control logic 501 also receives the predicted set index 504. In one embodiment, the ITLB 143 is a single-ported RAM structure. The correct set index 544, like the predicted set index 504, includes only translated address bits. The control logic 501 compares the correct set index 544 and the predicted set index 504 and generates a true value on a set mismatch indicator 552 if they do not match and otherwise generates a false value. The ITLB 143 and the portion of the control logic 501 that generates the set mismatch indicator 552 are shown in FIG. 5 as a translation sub-pipeline portion of the instruction fetch pipeline 500.

The control logic 501 generates a folded 551 control signal that controls the tset mux 532 and the dway mux 534. The folded 551 signal determines whether the instruction fetch pipeline 500 operates in a folded mode or in an unfolded mode. Generally, the control logic 501 generates a true value on the folded 551 signal if BTB hit 502 is true and otherwise generates a false value, although other circumstances are described below in which the control logic 501 may generate a true value on the folded 551 signal.

The tset mux 532 receives the correct set index 544 and the predicted set index 504 and selects the predicted set index 504 if the folded 551 signal is true and selects the correct set index 544 otherwise. The output of the tset mux 532 is combined with untranslated FVA bits 513 to form an IC set index 533 used to select a set of tags 522 of the ICTR 522 that are provided to the control logic 501. In one embodiment, the ICTR 522 is a single-ported RAM structure. The control logic 501 compares each of the tags 522 with the FPA tag 546 and generates a true value on an IC hit indicator 558 if a valid match is found and otherwise generates a false value. If the IC hit indicator 558 is true, the control logic 501 also generates a correct way number 556 that indicates the way of the instruction cache 101 that was hit. Additionally, the control logic 501 compares the correct way number 556 with the predicted way number 506 and generates a true value on a way mismatch indicator 554 if they do not match and otherwise generates a false value. The ICTR 522, tset mux 532 and the portion of the control logic 501 that generates the way mismatch indicator 554, the correct way number 556, and the IC hit indicator 558 are shown in FIG. 5 as a tag sub-pipeline portion of the instruction fetch pipeline 500.

The dway mux 534 receives the correct way number 556 and the predicted way number 506 and outputs selects the predicted way number 506 if the folded 551 signal is true and selects the correct way number 556 otherwise. The selected input is provided as an IC way number 535 that is used, along with the IC set index 533, to select an entry of the ICDR 524 that provides a cache line of data that is a fetched block of instructions 562 that is provided to the FBB 108 of FIG. 1. More specifically, even though the ICDR 524 is arranged in a set-associative fashion (i.e., having multiple ways), only a single way (i.e., only a single cache entry) of the selected set is read out. Advantageously, by reading out only a single way of the ICDR 524, significant power savings may be enjoyed over a conventional design that reads out all N ways, i.e., the cache lines of all the N entries, of a selected set of a data structure and then selects one of the cache lines after the correct way number has been determined from the lookup in the tag structure. As described herein, the power saving advantage just described is also enjoyed along with the low latency advantage of a folded pipeline since the described embodiments do not have to wait for the correct way number to be determined but instead immediately access the ICDR 524 using the predicted way number 506 predicted by the BTB 152. Although not shown, the fetch block length 308 is also output by the FBD FIFO 104 as part of the fetch request 511 and may be used to qualify the number of bytes of the fetched instruction block 562 that are written to the FBB 108. Additionally, in one embodiment the ICDR 524 comprises multiple adjacent RAM macros, e.g., each of four RAM macros is 16 bytes wide to provide a 64-byte instruction block 562, and the fetch block length 308 may be used to save additional power by reading out from only the necessary one or more RAM macros. For example, assume the offset into the cache line indicated by the untranslated lower bits of the FVA 512 are at byte 3 and the fetch block length 208 is 11 bytes, then only a single RAM macro (i.e., the first RAM macro) is read out and the other three RAM macros are not read out, which may save power relative to an embodiment that reads out all four of the RAM macros without regard for the fetch block length 208. In one embodiment, the ICDR 524 is a single-ported RAM structure. The ICDR 524 and the dway mux 534 are shown in FIG. 5 as a data sub-pipeline portion of the instruction fetch pipeline 500.

As described herein, when the BTB hit indicator 502 indicates that the BTB 152 has provided a predicted set index and a predicted way number, the instruction fetch pipeline 500 may operate in a folded pipeline mode such that the translation sub-pipeline, the tag sub-pipeline, and the data sub-pipeline operate in parallel to significantly reduce the latency of the instruction fetch pipeline 500. More specifically, in the data sub-pipeline the instruction block 562 is advantageously immediately fetched from the ICDR 524 using the predicted set index 504 and the predicted way number 506, while in parallel in the translation sub-pipeline the ITLB 143 translates the FVA 512 into the FPA 542 and the control logic 501 generates the set mismatch 552 signal, and in parallel in the tag sub-pipeline the ICTR 522 determines the correct way number 556 and generates the way mismatch 554 signal. However, in other circumstances, e.g., a miss in the BTB 152, the instruction fetch pipeline 500 may briefly operate in an unfolded pipeline mode as needed such that the translation sub-pipeline, the tag sub-pipeline, and the data sub-pipeline operate sequentially. The instruction fetch pipeline 500 may also include staging registers (not shown) that stage various signals as needed. For example, when operating in unfolded mode, the correct set index 544 may be staged down from the translation sub-pipeline to the tag sub-pipeline, and the IC set index 533 may be staged down from the tag sub-pipeline to the data sub-pipeline.

Figure 6:
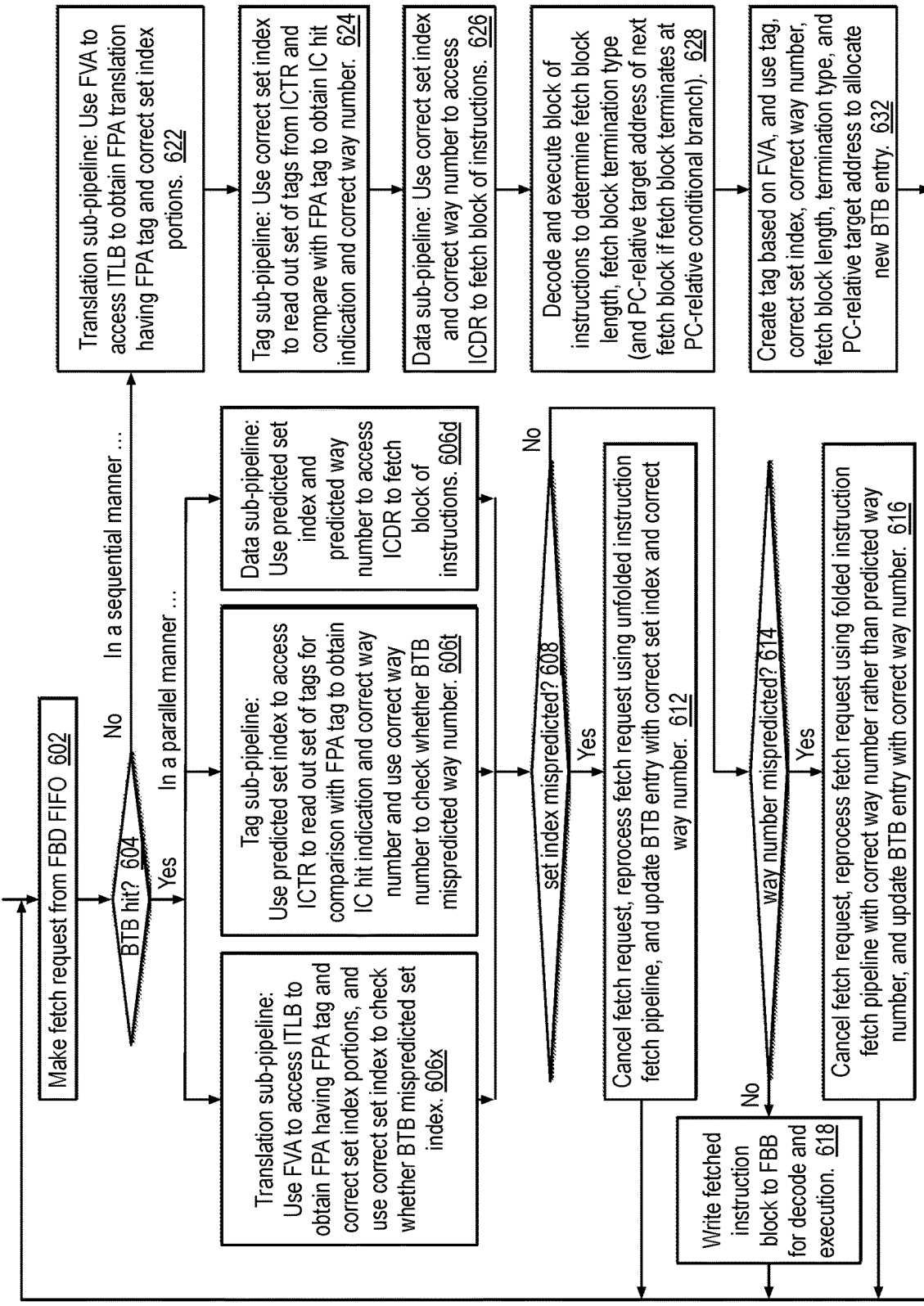
FIG. 6 is an example flowchart illustrating operation of the PRU of FIG. 4 and the instruction fetch pipeline of FIG. 5 in accordance with embodiments of the present disclosure.

FIG. 6 is an example flowchart illustrating operation of the PRU 102 of FIG. 4 and the instruction fetch pipeline 500 of FIG. 5 in accordance with embodiments of the present disclosure. Operation begins at block 602.

At block 602, a fetch request 511 of FIG. 5 is made from the FBD FIFO 104. Operation proceeds to decision block 604.

At decision block 604, if the BTB hit indicator 502 is true, operation proceeds to blocks 606x, 606t, and 606d, which are performed in a parallel manner, e.g., the control logic 501 generates a true value on the folded signal 551; otherwise, operation proceeds to block 622, and blocks 622, 624, and 626 are performed in a sequential manner, e.g., the control logic 501 generates a false value on the folded signal 551.

At block 606x, in the translation sub-pipeline, the FVA 512 is used to access the ITLB 143 to obtain the translation of the FVA 512, i.e., FPA 542, which includes the FPA tag 546 and the correct set index 544. In one embodiment, the IC set index 533 is a hash of lower bits of the FPA 542 (e.g., FPA[16:7]) with higher bits of the FPA 542. Additionally, the correct set index 544 is used by the control logic 501 to check whether the BTB 152 mispredicted the set index, i.e., whether the predicted set index 504 does not match the correct set index 544. Operation proceeds from block 606x to decision block 608.

At block 606t, in the tag sub-pipeline, the predicted set index 504 is used to access the ICTR 522 to read out a set of tags 553 for comparison with the FPA tag 546 to obtain the IC hit indicator 558 and correct way number 556. Additionally, the correct way number 556 is used by the control logic 501 to check whether the BTB 152 mispredicted the way number, i.e., whether the predicted way number 506 does not match the correct way number 556. Operation proceeds from block 606t to decision block 608.

At block 606d, in the data sub-pipeline, the predicted set index 504 and the predicted way number 506 are used to access the ICDR 524 to fetch an instruction block 562. Operation proceeds from block 606d to decision block 608.

At decision block 608, if the set mismatch 552 indicator is true, operation proceeds to block 612; otherwise, operation proceeds to decision block 614.

At block 612, because the set index was mispredicted by the BTB 152, the current fetch request 511 is canceled, i.e., none of the bytes of the fetched instruction block 562 are written into the FBB 108. Furthermore, the instruction fetch pipeline 500 reprocesses the fetch request 511 in the unfolded mode, i.e., in a sequential manner, similar to the manner described with respect to blocks 622, 624 and 626. In an alternate embodiment, the instruction fetch pipeline 500 reprocesses the fetch request 511 in a partially folded manner. That is, the control logic 501 controls the tag sub-pipeline to use the correct set index 544 obtained from the first/canceled processing instance of the fetch request 511 to, during the second processing instance of the fetch request 511, initiate access of the ICTR 522 in parallel with the initiation of the lookup of the FVA 512 in the ITLB 143, and the control logic 501 controls the data sub-pipeline to, in a sequential manner, wait and use the correct set index 544 obtained from the translation sub-pipeline and the correct way number 556 obtained from the tag sub-pipeline to access the ICDR 524 to fetch the instruction block 562. In both embodiments, because the BTB 152 mispredicted the set index in the first/canceled processing instance, the instruction fetch pipeline 500 was not able to determine the correct way number during the first/canceled processing instance, so it is assumed that the BTB 152 also mispredicted the way number. Finally, after the second processing instance, the BTB entry 200 that mispredicted is updated with the correct set index 544 and correct way number 556. Operation returns to block 602 to process the next fetch request 511.

At decision block 614, if the way mismatch 554 indicator is true, operation proceeds to block 616; otherwise, operation proceeds to block 618.

At block 616, because the way number was mispredicted by the BTB 152, the current fetch request 511 is canceled. Furthermore, the instruction fetch pipeline 500 reprocesses the fetch request 511 in the folded mode, i.e., in a parallel manner, similar to the manner described with respect to blocks 606x, 606t and 606d but using the correct set index 544 and correct way number 556 obtained during the first/canceled processing instance of the fetch request 511. Finally, after the second processing instance, the BTB entry 200 that mispredicted is updated with the correct way number 556. Operation returns to block 602 to process the next fetch request 511.

At block 618, because the set index and way number were correctly predicted by the BTB 152, the fetched instruction block 562 is written to the FBB 108 for subsequent decode by the decode unit 112 and execution by the execution units 114. Operation returns to block 602 to process the next fetch request 511.

At block 622, in the translation sub-pipeline, the FVA 512 is used to access the ITLB 143 to obtain the translation of the FVA 512, i.e., FPA 542, which includes the FPA tag 546 and the correct set index 544. Additionally, the correct set index 544 is used by the control logic 501 to check whether the BTB 152 mispredicted the set index. Operation proceeds to block 624.

At block 624, in the tag sub-pipeline, the correct set index 544 provided by the translation sub-pipeline at block 622 is used to access the ICTR 522 to read out a set of tags 553 for comparison with the FPA tag 546 to obtain the IC hit indicator 558 and correct way number 556. Additionally, the correct way number 556 is used by the control logic 501 to check whether the BTB 152 mispredicted the way number. Operation proceeds to block 626.

At block 626, in the data sub-pipeline, the correct set index 544 provided by the translation sub-pipeline at block 622 and the correct way number 556 provided by the tag sub-pipeline at block 624 are used to access the ICDR 524 to fetch an instruction block 562 that is written to the FBB 108. That is, blocks 622, 624, and 626 are performed in a sequential manner according to an unfolded mode of the instruction fetch pipeline 500. Operation proceeds to block 628.

At block 628, the instruction block 562 written to the FBB 108 at block 626 is subsequently fetched from the FBB 108 and decoded by the decode unit 112, and the decoded instructions are dispatched to the execution units 114 for execution. During the decode and execution of the instructions, the fetch block length, the termination type, and the PC-relative target address of the next fetch block (in the case the fetch block terminates in a PC-relative conditional branch instruction) may be determined. Operation proceeds to block 632.

At block 632, a BTB tag is generated based on the FVA 512, e.g., a hash as described above with respect to FIG. 2. The generated BTB tag, the correct set index 544 determined at block 622, the correct way number 556 determined at block 624, and the fetch block length, the termination type, and the PC-relative target address determined at block 628, are used to create and allocate a new BTB entry 200 into the BTB 152. Operation returns to block 602 to process the next fetch request 511.

As described above, advantageously the instruction fetch pipeline may be shortened/folded while also obtaining the power saving benefit of reading out only a single way of the instruction cache data RAM per instruction block fetch. The power savings may be particularly significant in embodiments in which the amount of bytes per data RAM entry is large, e.g., 64 bytes per entry as in one embodiment and 128 bytes per entry as in another embodiment. Further advantageously, the described embodiments may enable the processor 100 to have a single first-level instruction cache 101 that is large relative to a conventional design that has multiple levels of instruction cache and in which the first-level instruction cache is relatively small in order to facilitate single-clock cycle accesses since the conventional instruction fetch pipeline does not operate in a folded manner. In one embodiment, the instruction cache 101 is arranged as 2048 sets and 4 ways for a total of 8192 entries each holding a 64-byte cache line of instructions, and the ICDR 524 is a 512 KB RAM having a latency of two clock cycles when operating in folded mode, whereas in contrast a first-level instruction cache of a conventional multi-level instruction cache hierarchy design in a similar semiconductor technology may be a 32 KB or 64 KB cache, which may result in a lower hit rate than the larger first-level instruction cache 101 of the described embodiments. Further advantageously, the described embodiments may enable the processor 100 to have an ITLB 143 that is large relative to a conventional design in which the instruction TLB is/are relatively small in order to facilitate single-clock cycle accesses since the conventional instruction fetch pipeline does not operate in a folded manner. In one embodiment, the ITLB 143 comprises three TLBs that respectively support three different page sizes (e.g., 4 KB, 2 MB, and 1 GB pages) and collectively comprise more than three thousand entries and which have a two clock cycle access latency.

Figure 7:
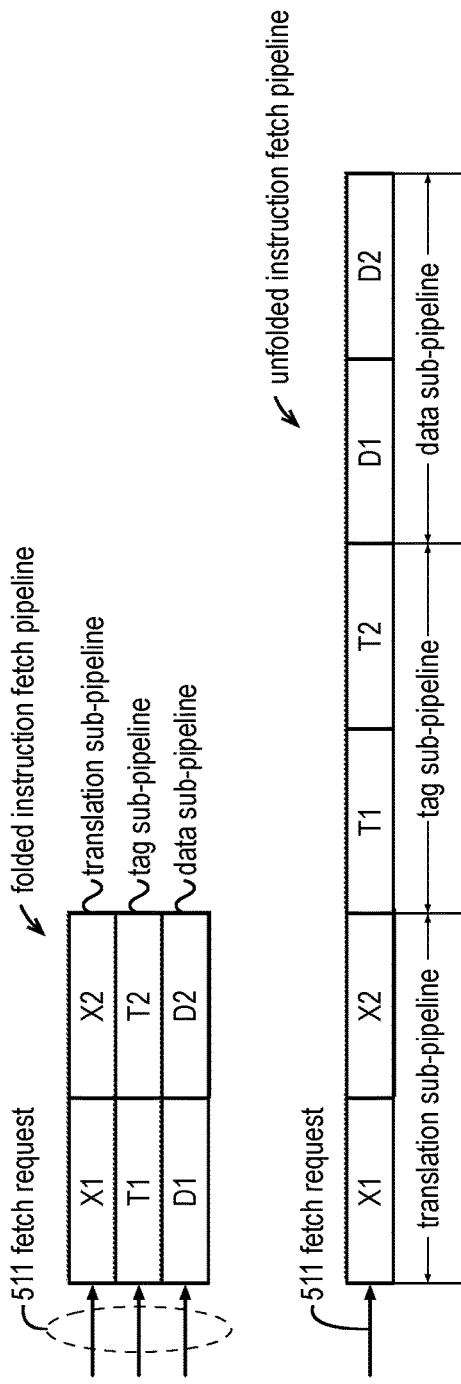
FIG. 7 is two example pipeline diagrams illustrating dynamic operation of the instruction fetch pipeline of FIG. 5 in both a folded mode and in an unfolded mode in accordance with embodiments of the present disclosure.

FIG. 7 is two example pipeline diagrams illustrating dynamic operation of the instruction fetch pipeline 500 of FIG. 5 in both a folded mode and in an unfolded mode in accordance with embodiments of the present disclosure. In the example embodiment of FIG. 7, each of the translation, tag, and data sub-pipelines comprises two pipeline stages. The two translation sub-pipeline stages are designated X1 and X2; the two tag sub-pipeline stages are designated T1 and T2; and the two data sub-pipeline stages are designated D1 and D2.

The folded mode of operation is shown in the top pipeline diagram of FIG. 7 in which each of the three sub-pipelines operate in parallel. More specifically, the X1, T1 and D1 stages each process a portion of the fetch request 511 during a first clock cycle, and the X2, T2 and D2 stages each process a portion of the fetch request 511 during a next clock cycle. In this manner, the effective latency of the instruction fetch pipeline 500 incurred by the three sub-pipelines during folded mode operation is only two clock cycles, in contrast to the six clock cycles incurred by the three sub-pipelines in the unfolded mode, as will now be described.

The unfolded mode of operation is shown in the bottom pipeline diagram of FIG. 7 in which each of the three sub-pipelines operate sequentially. More specifically, the X1 stage processes the fetch request 511 during a first clock cycle, then the X2 stage processes the fetch request 511 during a second clock cycle, then the T1 stage processes the fetch request 511 during a third clock cycle, then the T2 stage processes the fetch request 511 during a fourth clock cycle, then the D1 stage processes the fetch request 511 during a fifth clock cycle, then the D2 stage processes the fetch request 511 during a sixth clock cycle. In this manner, the effective latency of the instruction fetch pipeline 500 during unfolded mode operation incurred by the three sub-pipelines is six clock cycles.

In one embodiment, as described above, the ITLB 143, the ICTR 522, and the ICDR 524 are all singe-ported RAM structures. As described herein, the instruction fetch pipeline 500 may dynamically switch back and forth between the folded and unfolded modes, an embodiment of which is described below with respect to FIG. 8. For example, the instruction fetch pipeline 500 may switch to unfolded mode if the fetch request 511 indicates a miss in the BTB 152, e.g., via BTB hit indicator 502, or there is a miss in the ITLB 143 or instruction cache 101, as described below with respect to FIG. 8. In one embodiment, the switch back to the folded pipeline operation occurs right after processing of the current fetch request that requires unfolded pipeline operation. That is, the pipeline unfolds only for one fetch request and then refolds unless the next fetch request requires processing via an unfolded pipeline, e.g., BTB miss. In this manner, sub-pipeline conflicts, e.g., between the data sub-pipeline stages of the unfolded pipeline and the data sub-pipeline stages of the folded pipeline, are avoided. As a result, the start of processing of the next fetch request is delayed until the current fetch request is in the D1 sub-pipeline stage. Thus, in the embodiment of FIG. 7, there is a four-cycle delay for switching from an unfolded pipeline back to a folded pipeline if the next fetch request is immediately ready behind the current fetch request, whereas the delay is reduced if there is a gap between current and next fetch requests. In an alternate embodiment, the pipeline refolds for the next fetch request independent of the BTB hit indicator 502 (although as described above, depending upon when the next fetch request is ready behind the current fetch request, a delay may be incurred for switching from an unfolded pipeline back to a folded pipeline in order to avoid sub-pipeline conflicts). In yet another embodiment, the pipeline may remain unfolded and continue to operate in an unfolded manner for subsequent fetch requests until one or more events occur, e.g., the FBD FIFO 104 is empty, a branch misprediction is detected that causes the front-end 110 to be flushed, etc. In such an embodiment, the pipeline may continue to operate in a fully pipelined manner as long as the FBD FIFO 104 is not empty.

Figure 8:
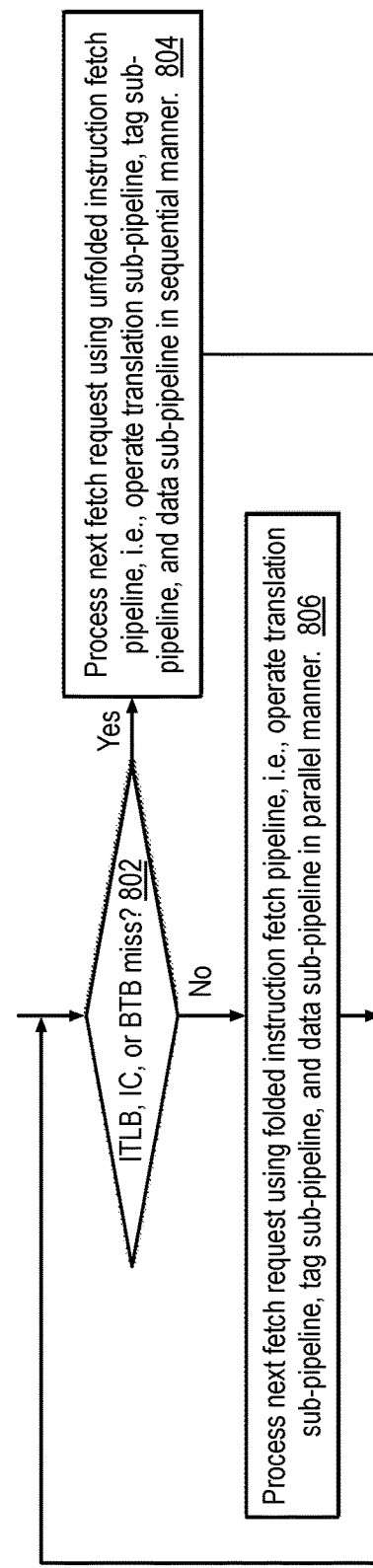
FIG. 8 is an example is an example flowchart illustrating operation of the instruction fetch pipeline of FIG. 5 in accordance with embodiments of the present disclosure.

FIG. 8 is an example flowchart illustrating operation of the instruction fetch pipeline 500 of FIG. 5 in accordance with embodiments of the present disclosure. Operation begins at decision block 802.

At block 802, if there is a miss in the ITLB 143, instruction cache 101, or BTB 152 (e.g., as determined at decision block 604 of FIG. 6), operation proceeds to block 804; otherwise, operation proceeds to block 806.

At block 804, the instruction fetch pipeline 500 processes the next fetch request 511 in an unfolded manner, i.e., the translation, tag, and data sub-pipelines operation in a sequential manner, e.g., as described above with respect to block 622, 624, and 626 of FIG. 6. Operation returns to decision block 802 to process the next fetch request 511.

At block 806, the instruction fetch pipeline 500 processes the next fetch request 511 in an folded manner, i.e., the translation, tag, and data sub-pipelines operation in a parallel manner, e.g., as described above with respect to block 606x, 606t, and 606d of FIG. 6. Operation returns to decision block 802 to process the next fetch request 511.

It should be understood—especially by those having ordinary skill in the art with the benefit of this disclosure— that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A microprocessor, comprising:
   a branch target buffer (BTB) comprising a plurality of entries, wherein each entry is configured to hold:
      a tag that is based on at least a portion of a virtual address of a block of instructions previously fetched from a physically-indexed physically-tagged set associative instruction cache using a physical address that is a translation of the virtual address;
      a translated address bit portion of a set index of an entry of the instruction cache from which the block of instructions was previously fetched; and
      a way number of the entry of the instruction cache from which the block of instructions was previously fetched;
   wherein in response to a hit on an entry of the plurality of entries of the BTB based on a fetch virtual address, the BTB is configured to provide:
      a translated address bit portion of a predicted set index that is the translated address bit portion of the set index from the hit entry of the BTB; and
      a predicted way number that is the way number from the hit entry of the BTB;
   wherein the block of instructions comprises a sequential run of instructions;
   wherein each entry of the BTB is further configured to hold:
      a length of the sequential run of instructions; and
      a termination type of the sequential run of instructions, wherein the termination type specifies a reason for termination of the sequential run of instructions, wherein the reason includes a presence of a branch instruction that terminates the block of instructions or that the block of instructions continues sequentially into a next block of instructions; and
   wherein in response to the hit on the entry of the plurality of entries of the BTB based on the fetch virtual address, the BTB is further configured to provide:
      a length that is the length from the hit entry of the BTB; and
      a termination type that is the termination type from the hit entry of the BTB.

2. The microprocessor of claim 1,
   wherein in parallel with translation of the fetch virtual address into a fetch physical address by a translation lookaside buffer (TLB):
      the predicted set index and the predicted way number are used to fetch the block of instructions from a data random access memory (RAM) of the instruction cache.

3. The microprocessor of claim 2,
   wherein in parallel with the fetch of the block of instructions from the data RAM using the predicted set index and the predicted way number:
      the predicted set index is used to read out a set of tags from a tag RAM of the instruction cache for comparison with a tag portion of the fetch physical address to determine a correct way number.

4. The microprocessor of claim 3,
   wherein the correct way number is used to check correctness of the predicted way number.

5. The microprocessor of claim 4,
wherein if the predicted way number is incorrect, the correct way number is used to update the hit entry of the BTB.

6. The microprocessor of claim 2,
wherein a correct set index portion of the fetch physical address is used to check correctness of the predicted set index.

7. The microprocessor of claim 6,
wherein if the predicted set index is incorrect, the correct set index portion of the fetch physical address is used to update the hit entry of the BTB.

8. The microprocessor of claim 2,
wherein to fetch the block of instructions from the data RAM using the predicted set index and the predicted way number, only a single way of the data RAM is read out.

9. The microprocessor of claim 1,
wherein in response to a miss in the BTB, an entry of the plurality of entries of the BTB is allocated into the BTB with a correct set index and a correct way number.

10. The microprocessor of claim 1,
wherein the BTB further comprises:
    a set index input that receives a set index value that is based on at least a first portion of the fetch virtual address; and
    a tag input that receives a tag value that is based on at least a second portion of the fetch virtual address.

11. A method, comprising:
in a microprocessor that includes a branch target buffer (BTB) comprising a plurality of entries, wherein each entry is configured to hold:
    a tag that is based on at least a portion of a virtual address of a block of instructions previously fetched from a physically-indexed physically-tagged set associative instruction cache using a physical address that is a translation of the virtual address;
    a translated address bit portion of a set index of an entry of the instruction cache from which the block of instructions was previously fetched; and
    a way number of the entry of the instruction cache from which the block of instructions was previously fetched;
in response to a hit on an entry of the plurality of entries of the BTB based on a fetch virtual address:
    providing, by the BTB, a translated address bit portion of a predicted set index that is the translated address bit portion of the set index from the hit entry of the BTB; and
    providing, by the BTB, a predicted way number that is the way number from the hit entry of the BTB;
wherein the block of instructions comprises a sequential run of instructions;
wherein each entry of the BTB is further configured to hold:
    a length of the sequential run of instructions; and
    a termination type of the sequential run of instructions, wherein the termination type specifies a reason for termination of the sequential run of instructions, wherein the reason includes a presence of a branch instruction that terminates the block of instructions or that the block of instructions continues sequentially into a next block of instructions; and
wherein in response to the hit on the entry of the plurality of entries of the BTB based on the fetch virtual address, further:
    providing, by the BTB, a length that is the length from the hit entry of the BTB; and
    providing, by the BTB, a termination type that is the termination type from the hit entry of the BTB.

12. The method of claim 11, further comprising:
in parallel with translation of the fetch virtual address into a fetch physical address by a translation lookaside buffer (TLB):
    using the predicted set index and the predicted way number to fetch the block of instructions from a data random access memory (RAM) of the instruction cache.

13. The method of claim 12, further comprising:
in parallel with the fetch of the block of instructions from the data RAM using the predicted set index and the predicted way number:
    using the predicted set index to read out a set of tags from a tag RAM of the instruction cache for comparison with a tag portion of the fetch physical address to determine a correct way number.

14. The method of claim 13, further comprising:
using the correct way number to check correctness of the predicted way number.

15. The method of claim 14, further comprising:
if the predicted way number is incorrect, using the correct way number to update the hit entry of the BTB.

16. The method of claim 12, further comprising:
using a correct set index portion of the fetch physical address to check correctness of the predicted set index.

17. The method of claim 16, further comprising:
if the predicted set index is incorrect, using the correct set index portion of the fetch physical address to update the hit entry of the BTB.

18. The method of claim 12,
wherein to fetch the block of instructions from the data RAM using the predicted set index and the predicted way number, only a single way of the data RAM is read out.

19. The method of claim 11, further comprising:
in response to a miss in the BTB, allocating an entry of the plurality of entries of the BTB into the BTB with a correct set index and a correct way number.

20. The method of claim 11,
wherein the BTB further comprises:
    a set index input that receives a set index value that is based on at least a first portion of the fetch virtual address; and
    a tag input that receives a tag value that is based on at least a second portion of the fetch virtual address.

21. A non-transitory computer-readable medium having instructions stored thereon that are capable configuring a microprocessor comprising:
    a branch target buffer (BTB) comprising a plurality of entries, wherein each entry is configured to hold:
        a tag that is based on at least a portion of a virtual address of a block of instructions previously fetched from a physically-indexed physically-tagged set associative instruction cache using a physical address that is a translation of the virtual address;
        a translated address bit portion of a set index of an entry of the instruction cache from which the block of instructions was previously fetched; and
        a way number of the entry of the instruction cache from which the block of instructions was previously fetched;

wherein in response to a hit on an entry of the plurality of entries of the BTB based on a fetch virtual address, the BTB is configured to provide:
  a translated address bit portion of a predicted set index that is the translated address bit portion of the set index from the hit entry of the BTB; and
  a predicted way number that is the way number from the hit entry of the BTB;
wherein the block of instructions comprises a sequential run of instructions;
wherein each entry of the BTB is further configured to hold:
  a length of the sequential run of instructions; and
  a termination type of the sequential run of instructions, wherein the termination type specifies a reason for termination of the sequential run of instructions, wherein the reason includes a presence of a branch instruction that terminates the block of instructions or that the block of instructions continues sequentially into a next block of instructions; and
wherein in response to the hit on the entry of the plurality of entries of the BTB based on the fetch virtual address, the BTB is further configured to provide:
  a length that is the length from the hit entry of the BTB; and
  a termination type that is the termination type from the hit entry of the BTB.

* * * * *